United States Patent [19]

Umemoto

[11] Patent Number: 4,718,305
[45] Date of Patent: Jan. 12, 1988

[54] PLANETARY BACKWARD AND FORWARD DRIVE APPARATUS

[75] Inventor: Tomeo Umemoto, Osaka, Japan

[73] Assignee: Kubota, Ltd., Osaka, Japan

[21] Appl. No.: 849,237

[22] Filed: Apr. 7, 1986

[30] Foreign Application Priority Data

Dec. 19, 1985 [JP] Japan .............................. 60-286797
Dec. 19, 1985 [JP] Japan .............................. 60-286798

[51] Int. Cl.$^4$ ....................... F16H 3/44; F16H 57/10
[52] U.S. Cl. ..................................... 74/784; 74/802; 192/87.17
[58] Field of Search .................. 74/784, 802; 192/184, 192/87.16, 87.17, 87.19

[56] References Cited

U.S. PATENT DOCUMENTS

| | | | |
|---|---|---|---|
| 2,336,459 | 12/1943 | Banker | 74/784 |
| 2,464,538 | 3/1949 | Vandevzee | 192/87.18 X |
| 2,488,540 | 11/1949 | Hollingsworth | 192/87.19 X |
| 2,979,176 | 4/1961 | Voth | 192/87.18 X |
| 3,009,370 | 11/1961 | Frost | 74/784 |
| 4,528,872 | 7/1985 | Umemoto et al. | 74/781 R |
| 4,532,827 | 8/1985 | Beim | 192/184 X |

FOREIGN PATENT DOCUMENTS 664013 7/1938 Fed. Rep. of Germany ... 192/87.17
531494 1/1922 France ................................. 74/784

Primary Examiner—Allan D. Herrmann
Assistant Examiner—Dirk Wright
Attorney, Agent, or Firm—Jordan & Hamburg

[57] ABSTRACT

There is disclosed a planetary backward and forward drive apparatus comprising a planetary gear mechanism disposed between an input and an output shafts. The planetary gear mechanism includes a carrier connected to the input shaft, two step planet gears supported by the carrier and consisting of a large first gear and a small second gear, a first sun gear connected to the output shaft, and a second sun gear freely rotatably mounted on the first sun gear and meshing with the second gear. A forward drive condition is provided when the carrier and the second sun gear are connected to each other by an operation of a hydraulic clutch, and a backward drive condition is provided when the second sun gear is fixed to a stationary case by an operation of a hydraulic brake.

5 Claims, 3 Drawing Figures

PLANETARY BACKWARD AND FORWARD DRIVE APPARATUS

BACKGROUND OF THE INVENTION

The present invention relates to a backward and forward drive apparatus switchable between a forward drive condition and a backward drive condition by a switching operation of two hydraulically operated clutches.

A known backward and forward switching apparatus comprises two hydraulically operated clutches for switching between the forward drive condition and the backward drive condition, mounted on a first transmission shaft acting as an input shaft to receive power from an engine, and a gear transmission mechanism provided between the first transmission shaft and a second transmission shaft parallel to the first transmission shaft to output backward and forward drives by switching operations of the hydraulically operated clutches.

In the above construction, however, since the simple gear transmission mechanism is employed, it is necessary to provide a backward drive gear mechanism bridging the two shafts which requires a large accommodating space.

SUMMARY OF THE INVENTION

An object of this invention is to provide a backward and forward switching apparatus incorporating a rationalized gear transmission mechanism thereby to reduce its accommodating space.

In one aspect of the invention, a planetary backward and forward drive mechanism comprises an input shaft operatively connected to an engine; an output shaft disposed coaxial with the input shaft; planetary gear means including a carrier connected to the input shaft, two step planet gears supported by the carrier and consisting of a large first gear and a small second gear, a first sun gear connected to the output shaft, and a second sun gear freely rotatably mounted on the first sun gear and meshing with the second gear; stationary means for rotatably supporting a clutch casing radially outwardly of the output shaft and including an internal gear meshing with the second sun gear; a first hydraulically operated clutch disposed between the carrier and the clutch casing to be shiftable to interconnect the carrier and the clutch casing thereby to cause the second sun gear and the carrier to rotate in unison; and a second hydraulically operated clutch disposed between the stationary means and the clutch casing to be shiftable to interconnect the stationary means and the clutch casing thereby to lock the second sun gear against rotation.

This construction is operable as follows: When the first clutch is engaged, the carrier and the second sun gear are rigidly interconnected and the planet gears in mesh with the second sun gear become rotatable in unison therewith. Consequently the transmission shaft and the first sun gear are rotatable in unison with the carrier through the planetary gear mechanism, thereby providing a forward drive condition. When the second clutch is engaged the second sun gear becomes fixed to the stationary part of the transmission case and the planetary gear mechanism becomes rotatable relative to the fixed second sun gear, causing the transmission shaft and the first sun gear in mesh with the planetary gear mechanism to rotate in the opposite direction, thereby providing a backward drive condition.

This construction permits the gear mechanism to be compactly mounted on the single transmission shaft by employing the planetary gear mechanism including the second sun gear relatively rotatably fitted on the first sun gear and to be switchable by the operation of the hydraulically operable clutches between a stationary position and a position rotatable in unison with the carrier. The clutch casing has only to be operatively connected to the second sun gear. This results in the axial arrangement of the planetary gear mechanism and the hydraulically operated clutches, which helps to reduce the accommodating space radially of the transmission shaft.

BRIEF DESCRIPTION OF THE DRAWINGS

The above and other objects and features of the present invention will become apparent from the following description taken in conjunction with the preferred embodiment thereof with reference to the accompanying drawings, in which.

DESCRIPTION OF THE PREFERRED EMBODIMENTS

Figure 1:
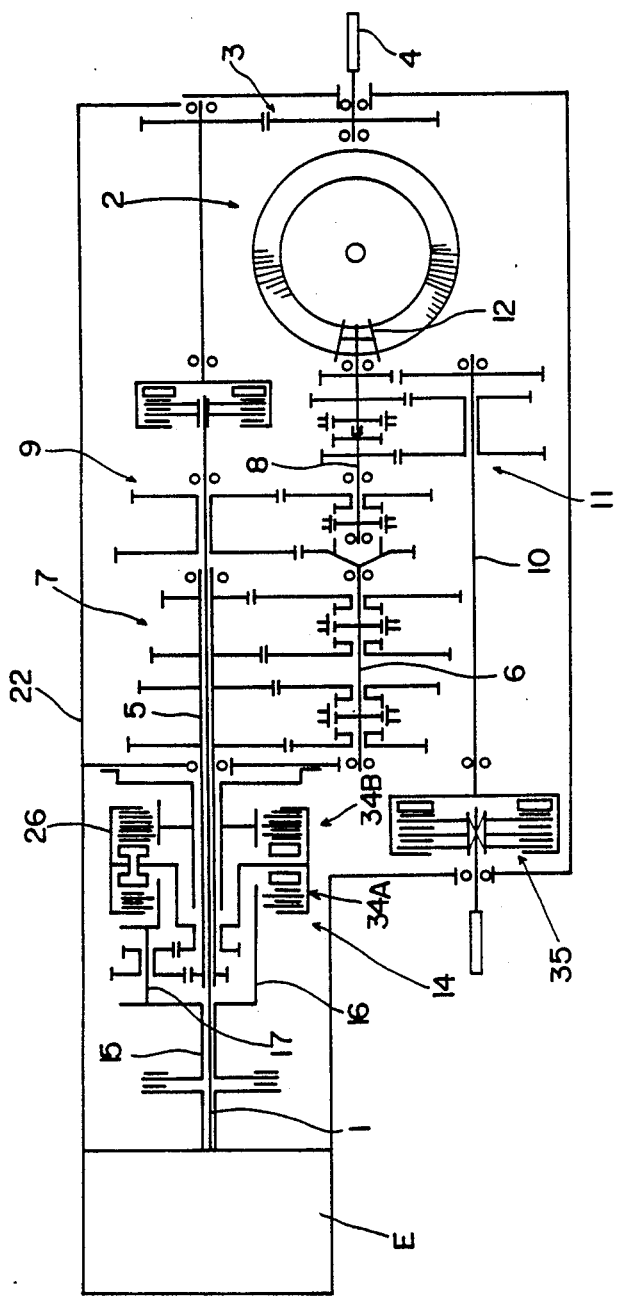
FIG. 1 a schematic overall view of a transmission including a planetary backward and forward drive apparatus embodying the present invention.

As shown in FIG. 1, a PTO output line comprises a PTO transmission shaft 1 directly connected to an engine E and extending rearwardly of a rear wheel differential 2 to be operatively connected to a PTO shaft 4 through a reduction gear mechanism 3. A first transmission shaft 5 is fitted on the PTO transmission shaft 1. A gear type main change speed mechanism 7 adapted to provide four speeds is arranged between the first transmission shaft 5 and a second transmission shaft 6 extending parallel to the first transmission shaft 5. A gear type auxiliary change speed mechanism 9 is arranged between the PTO transmission shaft 1 and a third transmission shaft 8 extending substantially coaxially from a rear end of the second transmission shaft 6. A super-reduction mechanism 11 is arranged between the third transmission shaft 8 and a front wheel drive shaft 10 extending parallel to the third transmission shaft 8. The third transmission shaft 8 carries an output bevel gear 12 for transmitting engine output to the rear wheel differential 2.

A backward and forward switching mechanism 14 is arranged between the engine E and the main change speed mechanism 7. This backward and forward switching mechanism 14 will be described next with reference to FIG. 2. A carrier 16 is splined to a rear end of an input shaft 15 fitted on the PTO transmission shaft 1 upstream of the first transmission shaft 5. The carrier 16 includes projecting pins 17 supporting large and small, two-step plant gears 18A and 18B. The input shaft 15 is operatively connected at a front end thereof to the engine E through a clutch C. A first sun gear 19 is splined to a front end of the first transmission shaft 5 opposed to the rear end of the input shaft 15. A second sun gear 20 is rotatably mounted on the first sun gear 19. The first sun gear 19 is in mesh with the large planet gears 18A while the second sun gear 20 is in mesh with the small planet gears 18B.

A cylindrical stationary member 23 which is an integral part of a transmission case 22 extends loosely over the first transmission shaft 5 coaxially with and rearwardly of the backward and forward switching planetary gear mechanism 21. A clutch casing 26 of hydraulically operated clutch and brake 34 is rotatably mounted on an outer periphery of the cylindrical stationary member 23 through bearings 36. The clutch casing 26 has a partition wall 27 at an intermediate position axially of the first transmission shaft 5, and a first chamber 28A and a second chamber 28B are defined to be axially opposed to each other across the partition wall 27. The first chamber 28A houses a first set of frictional plates 29A and a first piston 30A. The first piston 30A is movable leftward in FIG. 2 under oil pressure supplied through an oil passage 37 defined in the cylindrical stationary member 23 and an oil passage 38A defined in the clutch casing 26, to engage a first clutch 34A. The second chamber 28B houses a second set of frictional plates 29B and a second piston 30B. The second piston 30B is movable rightward in FIG. 2 under oil pressure supplied through the oil passage 37 and an oil passage 38B defined in the clutch casing 26, to engage a brake 34B. The first and second pistons 30A and 30B are rigidly interconnected by a plurality of coupling elements or bolts 32 equidistantly arranged in the peripheral direction of and extending through the clutch casing 26.

Figure 3:
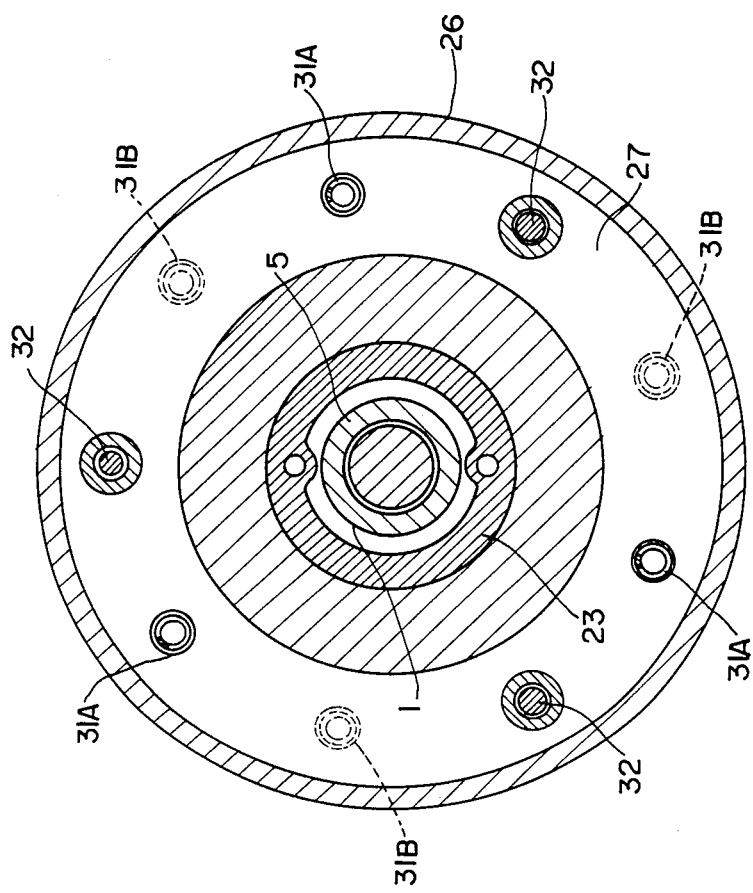
FIG. 3 is a sectional view taken on line III—III of FIG. 2.

First and a second sets of compression springs 31A and 31B are provided each having one end thereof embedded in the partition wall 27 and the other end rigidly attached to the piston 30A or 30B. These compression springs 31A and 31B urge the pistons 30A and 30B away from each other and cooperate with the coupling elements 32 to maintain the pistons 30A and 30B in the neutral position. As shown in FIG. 3, the coupling elements 32 and the first and second sets of compression springs 31A and 31B are arranged peripherally in different phases relative to one another. The compression springs 31A and 31B and the coupling elements or bolts are equidistantly arranged in the peripheral direction of the clutch casing 26.

The first set of frictional plates 29A is splined to a projecting end of the carrier 16, and the second set of frictional plates 29B is splined to a sleeve element 33 rigidly mounted on the cylindrical stationary member 23 extending from the transmission case. A base portion 27A continuous with the partition wall 27 of the clutch casing 26 defines an internal gear 27B in mesh with the second sun gear 20. Bearings 39 are disposed between the base portion 27A and the carrier 16 to support the carrier 16 and the clutch casing 26 to be rotatable relative to each other.

Figure 2:
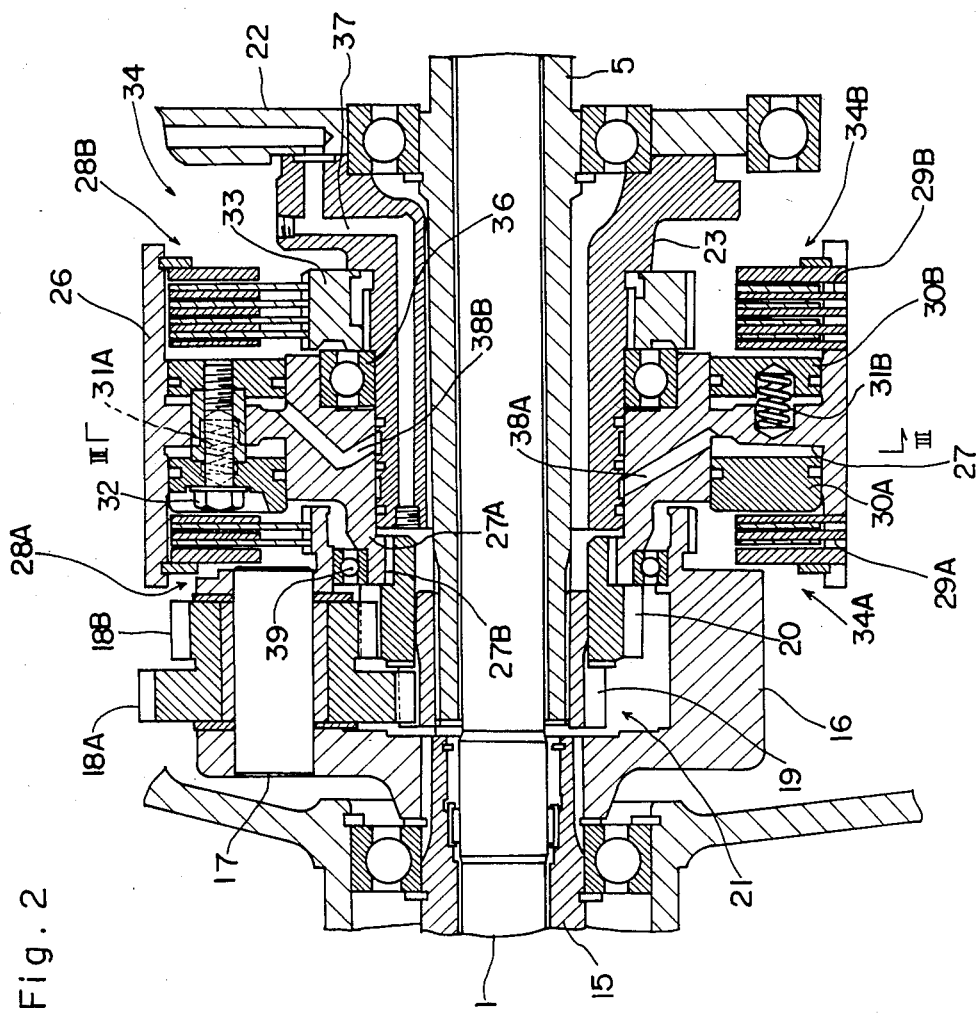
FIG. 2 is a side view in vertical section of the planetary backward and forward drive apparatus operable by hydraulically operated clutches.

When the clutch 34A is engaged, the carrier 16 and the clutch casing 26 are interconnected to be rotatable in unison and the second sun gear 20 too is rigidly connected thereto. Consequently the carrier 16 and the second sun gear 20 will rotate in unison and there will occur no relative rotation between the second sun gear 20 and the small planet gears 18B. Then the large planet gears 18A and the first sun gear 19 will cause the first transmission shaft 5 to rotate in the same direction in which the carrier 16 rotates, thereby providing a forward drive condition. On the other hand, when the brake 34B is engaged the clutch casing 26 is rigidly connected to the transmission case 22 to be held stationary whereby the second sun gear 20 too is locked against rotation. Consequently, the small planet gears 18B will rotate relative to the second sun gear 20 and, together with the first sun gear 19, cause the first transmission shaft 5 to rotate in the opposite direction, thereby providing a backward drive condition.

Where the planetary gear mechanism 21 and the hydraulically operable switching clutch and brake 34a and 34B are arranged axially of the first transmission shaft 5 as described, there is only a minor projection radially of the first transmission shaft 5 as shown in FIG. 2. A hydraulically operable clutch 35 for switching between a four wheel drive position and a two wheel drive position is disposed at a portion of the front wheel drive shaft 10 opposed to the backward and forward switching mechanism 14 having a reduced size.

What is claimed is:

1. A planetary backward and forward drive mechanism comprising;
   an input shaft operatively connected to an engine,
   an output shaft disposed coaxial with said input shaft,
   planetary gear means including a carrier connected to said input shaft, two step planet gears supported by the carrier and consisting of a large first gear and a small second gear, a first sun gear connected to the output shaft and meshing with said first gear, and a second sun gear freely rotatably mounted on the first sun gear and meshing with said second gear,
   stationary means radially surrounding said output shaft and comprising a cylindrical stationary member fixed to a stationary casing, said cylindrical stationary member being disposed in coaxial end-to-end relation with said second sun gear,
   hydraulic clutch and brake means including;
      a clutch casing rotatably supported radially outwardly of said cylindrical stationary member and having a partition wall, a first and a second chambers defined axially of said output shaft and opposed to each other across said partition wall, and a cylindrical base end portion extending from said partition wall toward said planetary gear means and having a radial inner surface splined to a radial outer surface of said second sun gear,
      a hydraulic clutch disposed in said first chamber and interconnecting said carrier and said clutch casing thereby to cause said second sun gear and said carrier to rotate in unison,
      a hydraulic brake disposed in said second chamber and interconnecting said stationary means and said clutch casing thereby to lock said second sun gear against rotation, and
   bearing means disposed between a radial outer surface of the splined cylindrical base end portion of said clutch casing and a radial inner surface of a projecting end extending toward said hydraulic clutch means of said carrier for permitting the relative rotation between said clutch casing and said carrier.

2. A drive mechanism as claimed in claim 1 wherein said hydraulic clutch and brake include frictional plates and pistons acting on the plates respectively, said pistons being rigidly interconnected by coupling means extending through said partition wall.

3. A drive mechanism as claimed in claim 2 wherein said frictional plates adjacent the carrier of said hydraulic clutch, are splined to the projecting end of said carrier.

4. A drive mechanism as claimed in claim 3 wherein a first spring means is diposed between said partition wall and said first piston, and a second spring means is disposed between said partition wall and said second piston, said first and second spring means being equidistantly arranged in a peripheral direction of the clutch casing, whereby said first and second pistons are maintained in a neutral state.

5. A drive mechanism as claimed in claim 4 wherein each of said spring means comprises a plurality of compression springs arranged equidistantly in the peripheral direction of the clutch casing.

* * * * *